United States Patent

[11] 3,560,716

[72] Inventor Robert E. White
Westbury, N.Y.
[21] Appl. No. 638,176
[22] Filed Apr. 21, 1967
[45] Patented Feb. 2, 1971
[73] Assignee OPTOmechanisms, Inc.
Plainview, N.Y.

[54] CODE MATRIX READER FOR FILM
6 Claims, 5 Drawing Figs.

[52] U.S. Cl. 235/61.11, 178/26; 353/26; 355/41
[51] Int. Cl. G06k 1/10
[50] Field of Search 235/61.115, 61.6A, 61.117; 340/174.1B; 178/26.5; 353/25, 26; 355/41

[56] References Cited

UNITED STATES PATENTS

| | | | |
|---|---|---|---|
| 2,723,308 | 11/1955 | Vroom | 178/26 |
| 2,848,534 | 8/1958 | Bliss | 178/26 |
| 3,432,673 | 3/1969 | Mader | 250/219 |
| 2,751,439 | 6/1956 | Burton | 179/100.2 |
| 2,937,239 | 5/1960 | Garber | 179/100.2 |
| 2,001,730 | 5/1935 | Ives | 178/6 |
| 3,100,264 | 8/1963 | Jaffe | 250/203 |
| 2,925,217 | 2/1960 | Watt | 235/61.6 |
| 3,335,287 | 8/1967 | Hargens | 250/227 |

*Primary Examiner*—Maynard R. Wilbur
*Assistant Examiner*—Robert F. Gnuse
*Attorney*—James P. Malone

ABSTRACT: A reader for a digital code matrix carried on a film having a scanning bar with a plurality of photo detectors is mounted on a frame. The frame is rectangular in shape and pivotally connected on each corner so that it can assume the shape of a parallelogram. This is necessary since the code matrix is quite often photographically deposited on the film when it is moving or not flat so that rectangular code pattern is skewed. The scanning bar is motor driven. The photo detectors are connected to suitable utilization apparatus. A variant of this arrangement uses sensors which are fixed and the image is moved over the sensors.

INVENTOR.
ROBERT E. WHITE
BY James P. Malone

INVENTOR.
ROBERT E. WHITE
James P. Malone

*INVENTOR.*
ROBERT E. WHITE
James P. Malone

CODE MATRIX READER FOR FILM

This invention relates to means for automatically reading out digital data from photographic film code matrix blocks.

In aerial survey film, it is desired that the film be identified and contain various reference information. The digital code may comprise a plurality of dots in rows and columns and the information may be inserted by various arrangements of the dots. Typical information might be map or other reference numbers, altitude, date, etc.

The code matrix reader is a device for semiautomatically sensing and transmitting the information contained in aerial film code matrices.

It represents a practical and economical approach; it is a considerable improvement over the laborious technique of visually reading off and mentally translating the code to decimal form and is much less costly than the very sophisticated techniques used in the fully automatic reading systems under development.

In one embodiment the code matrix is read with the film stationary. The operator positions the reader over the matrix, visually aligns a magnified projected image with reference lines, and presses a button which initiates an automatic scanning sequence. The data is transmitted electrically for display or for entry into a computer.

The reader uses a conventional rear projection viewer and contains a photoelectric scanning device for sensing the code matrix dots. The operator positions the view over the film, observing the matrix image on the screen. The image size is approximately 2½ × 4 inches. He adjust the magnification until the width of the matrix image matches the spacing between two reference lines on the screen and adjusts the skew of the reference lines with another control, so that it matches the outline of the matrix. He then initiates the readout sequence by depressing a button which actuates a mechanical scanning mechanisms directly behind the projection screen. The heart of the mechanisms is a row of photoelectric cells mounted on a bar which scans over the matrix image top to bottom. There is one cell for each column in the matrix including the index columns. The outputs of the photoelectric cells, for instance, operate solid state switches, not shown, whose outputs are in turn transmitted to interfacing equipment and then to a computer, display, or other utilization equipment.

In another embodiment the image of the code matrix is scanned over stationary but adjustable sensors.

Accordingly a principal object of the invention is to provide new and improved means for reading digital data.

Another object of the invention is to provide new and improved means for reading digital data carried on film.

Another object of the invention is to provide new and improved reading means for indicia, on film.

Another object of the invention is to provide new and improved means for automatically reading digital information photographically deposited and carried on film where the normally rectangular code block assumes a parallelogram shape due to the fact that the film was moving or curled or curved at the time the code matrix was photographically deposited on the film.

Another object of the invention is to provide new and improved reader for a code matrix carried on a film comprising a frame adapted to be mounted over an image of said matrix, a scanning means mounted on said frame, and a plurality of detectors mounted on said scanning means.

These and other object of the invention will be apparent from the following specification and drawing of which:

Figure 1:
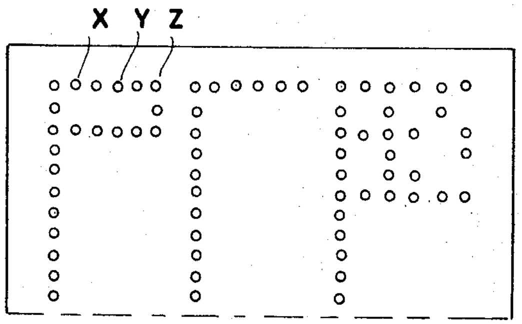
FIG. 1 is a partial showing of a typical code matrix.

Referring to FIG. 1, a typical code block is a nominally rectangular array of dots, of greater or lesser density than the background depending on whether film is positive or negative, approximately 0.33 × 0.53 inches. The pattern contains for instance 576 data bits which contain pertinent information about the imagery on the aerial film, i.e., geographical position, altitude, date, aircraft identification, etc. The data block is divided along the long dimension into three columns, each six data bits wide and thirty-two rows long. Each row consists of one index bit which is always present, four data bits and one parity bit for error checking. The data appears in sequence, most to least significant digit, down the column, each row representing one digit. Digit groups, one to seven rows, are separated by divider rows which contain a full six dots. A typical code pattern is illustrated in part in FIG. 1.

The data matrix size may vary in width and height and the position of the same numbered rows in different columns may also vary. In addition, the pattern may assume a rhomboid or parallelogram shape due to movement of the film during exposure.

The above mentioned tolerances on row positions, matrix size, and matrix shape present formidable problems to the design of a device for automatically reading out the data. The device described herein surmounts these problems.

Figure 2:
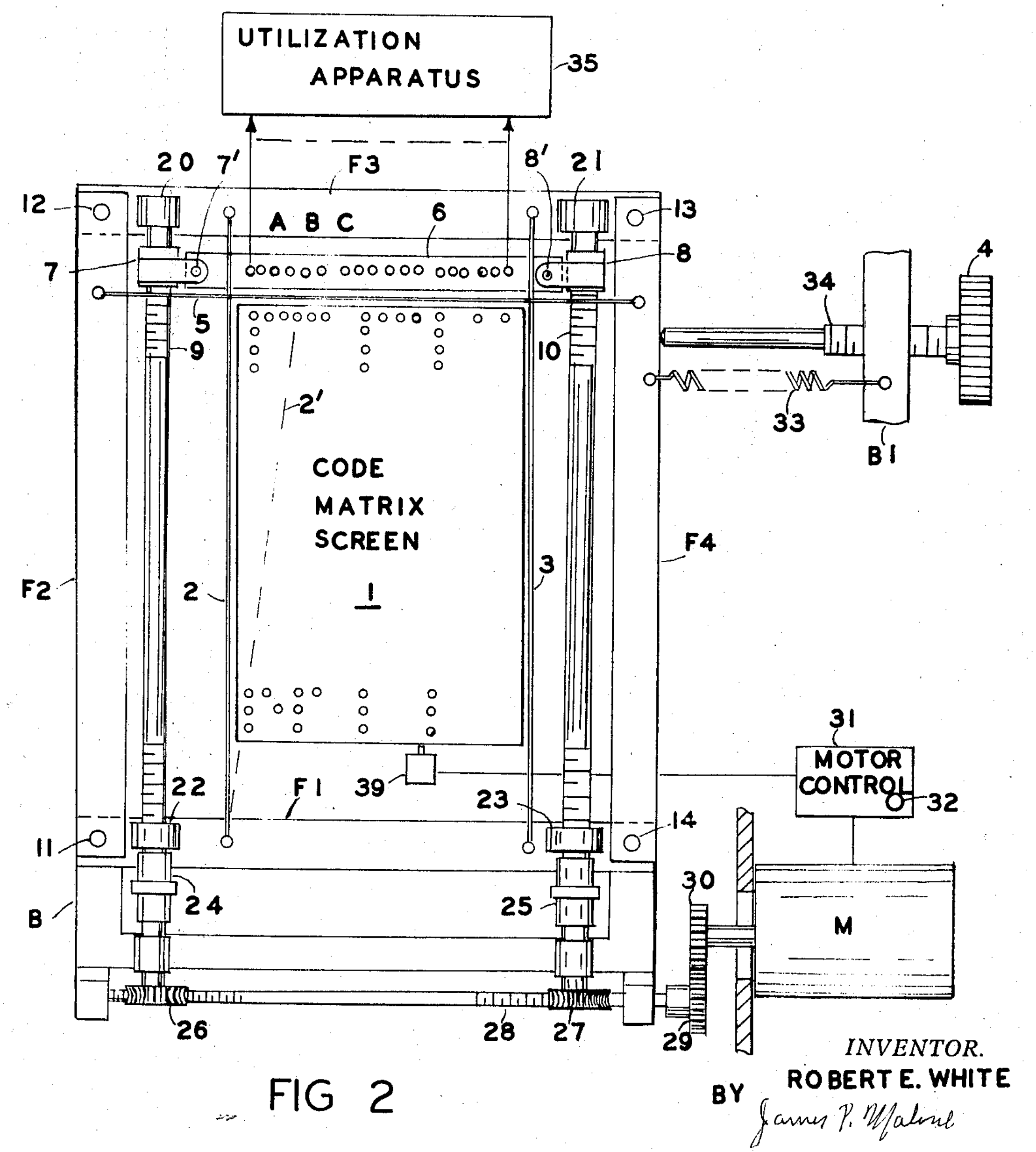
FIG. 2 is a plan view of an embodiment of the invention.

Referring to FIG. 2, a conventional rear projection viewer is placed over the code matrix so that the magnified image of the block appears on the transparent projection screen 1 of the reader. The illumination for the projection of the matrix is supplied by the instrument on which the reader is placed. Thus it is suitable for use with existing light tables. The operator adjusts the magnification of the projector so that the width of the image is made equal to a standard width which is represented as two parallel reference lines 2, 3 on or over the screen. The important feature here is that the operator need only adjust one dimension, width, of the image. The other dimension, height, will change correspondingly, however, its actual value and whether or not it corresponds to the "standard" size is of no consequence.

The operator also rotates the projection screen with the reference lines to adjust for any rotation of the complete code matrix on the film.

The operator has another control 4 which allows him to skew the two reference lines 2 and 3 with respect to a horizontal line 5 as will be explained.

Thus, by the manipulation of the magnification control, rotation of the screen, and operation of the skew control 4 the operator is able to align the three reference lines on the projection screen with the top and either side of the code matrix image, thus bounding the matrix on three of its four sides.

In performing these functions, the operator is actually aligning the data column to the path that a row of light sensitive detectors A, B, C, etc. will follow during the scanning sequence.

SCANNING AND SKEW COMPENSATION MECHANISM

Behind the projection screen 1 and actually attached to it is an electromechanical scanning mechanism. This mechanism consists of a row of photosensitive elements A, B, C, etc. mounted on a scanning bar 6 such that, as the bar is moved down each element passes over one column of data. In a typical matrix there are three main columns, each column having six data bit positions thus giving a total of 18 columns and, of course, 18 sensors. The proper tracking of the sensors down the column is insured by the previous alignment of the matrix image with the reference lines. The reference lines are produced wires 2, 3, 5, which are attached to the scanning mechanism.

The photosensitive elements are carried on a bar 6 which is supported at either end by nuts 7 and 8' which travel up and down synchronized lead screws 9 and 10. The lead screws are geared to a reversible motor M. Limit switches are preferably provided at the extremes of travel.

The complete assembly is mounted in a frame whose normal rectangular shape can be changed to that of a rhomboid or parallelogram since the corners of the frame connected by pivots 11, 12, 13 and 14. By the use of self aligning bearings on the lead screws and pivoting nuts on the photosensitive bar the photosensitive elements may trace either a rectangular or rhomboidal pattern corresponding to the shape of the code matrix image. Notice that the three shadow-producing reference wires are always aligned with the three edges of the pattern swept. The use of flexible universal couplings on the lead screws permits the drive motor and associated gearing to be mounted on the main support structure.

As the photo elements sweep down the columns, electrical signals are generated when dots are encountered. Three of the elements generate signals at every row. These elements are the ones scanning the reference columns, one reference column at the edge of each of the three main data group columns. These three signals are used to indicate the the appropriate time for reading out each of the other five bits in the row. Because of tolerances on the position of adjacent rows it is not sufficient to use the signal of only one reference column to initiate readout on all column rows; each main data column must be synchronized with the appearance, at the sensor, of the corresponding reference dots.

At the end of the scan an electrical switch 39 may be actuated by the scanning bar and the motor reversed causing the bar to retrace to its starting position.

Referring more specifically to FIG. 1 the frame comprises four members, F1, F2, F3, F4, which are pivotally connected together at their ends by means of the pins 11—14. Pins 11, and 14 are also connected to the base B. One end of each lead screw 9 and 10 are mounted in bearings 20, 21 which are mounted on member F3. The other ends of the lead screws are mounted on universal self alignment bearings 22, 23 which are mounted on the member F1. The lead screws are driven by means of couplings 24, 25 which are connected by worm wheel gears 26, 27 to the worm gear 28 which is rotatably mounted on the base B by means of suitable bearings. The worm gear 28 is connected by means of gears 29 and 30 to the motor M. The motor is adapted to be controlled by the motor control 31 which may have a starter button 32.

The skewing control means is as follows:

The frame member F4 is connected by means of the spring 33 to the base member B1 is fixedly connected to the base B. The skewing of the frame is done by means of the control screw 34 which is threaded into the member B1 and which may be turned by the control knob 4. Therefore by turning the control knob 4 the screw 34 may be retracted allowing the spring 33 to cause the frame to take a parallelogram shape for instance, so that the reference line 2 will take the position of the dotted line 2'. The nuts 7 and 8 are pivotally connected to the scan bar 6 by means of pins 7' and 8' and the nuts are mounted on the lead screws 9 and 10 so that when the lead screws rotate, the nuts and the scanning bar travel up and down over the code matrix area 1. Universal type bearings 21 and 23 are provided to permit operation when the frame is skewed.

Various automatic controls may be incorporated such as limits switches with automatic stop and return the limit switches which may be also connected to control external utilization apparatus such as computers, indicators, etc.

The advantages of this projection and scanning system are as follows:

1. Operator can by direct viewing of the magnified image correct for:
   a. Variation in matrix size for nominal
   b. Rotation of matrix on film
   c. Skew or rhomboidal shape of matrix due to motion of film during exposure
   d. Other distortions introduced by annotation system or film distortion—this he does when he tries to obtain the "best fit" of the code matrix image with the reference lines.
2. The device can be used in conjunction with any device that can supply an illumination source for projection of the image. It does not require a high level of illumination; 500 to 1,000 foot lamberts is more than sufficient. This permits its use on existing film viewing tables with provision for mounting the projector over the film the only requirement.
3. The data is read out serially and in a form which is the same as the numerical sequence of the parameter annotated. This greatly simplifies subsequent processing of the data.
4. Scanning mechanism requires no accurate control of readout speed. Data appearance is synchronized with reference column dots.
5. Reversed matrix patterns, either left to right, or top to bottom, can be accommodated by electrically switching photo sensor outputs and/or reversing direction of scan.
6. Operator can inspect quality of code matrix to insure that annotation system and/or subsequent processing has not produced an unreadable pattern. Some fully automatic systems do not have this capability.

The signals generated by the photosensitive elements are preferably amplified and used to actuate bistable switches to give a positive 1 or 0 indication for transmission when the reference dot is sensed.

Electronic utilization means 35 of conventional design may be employed to store, rearrange, decode, display the data, or check for errors. This ancillary equipment is within the state-of-the-art and does not present a problem in the utilization of this code matrix reading system.

Figure 3:
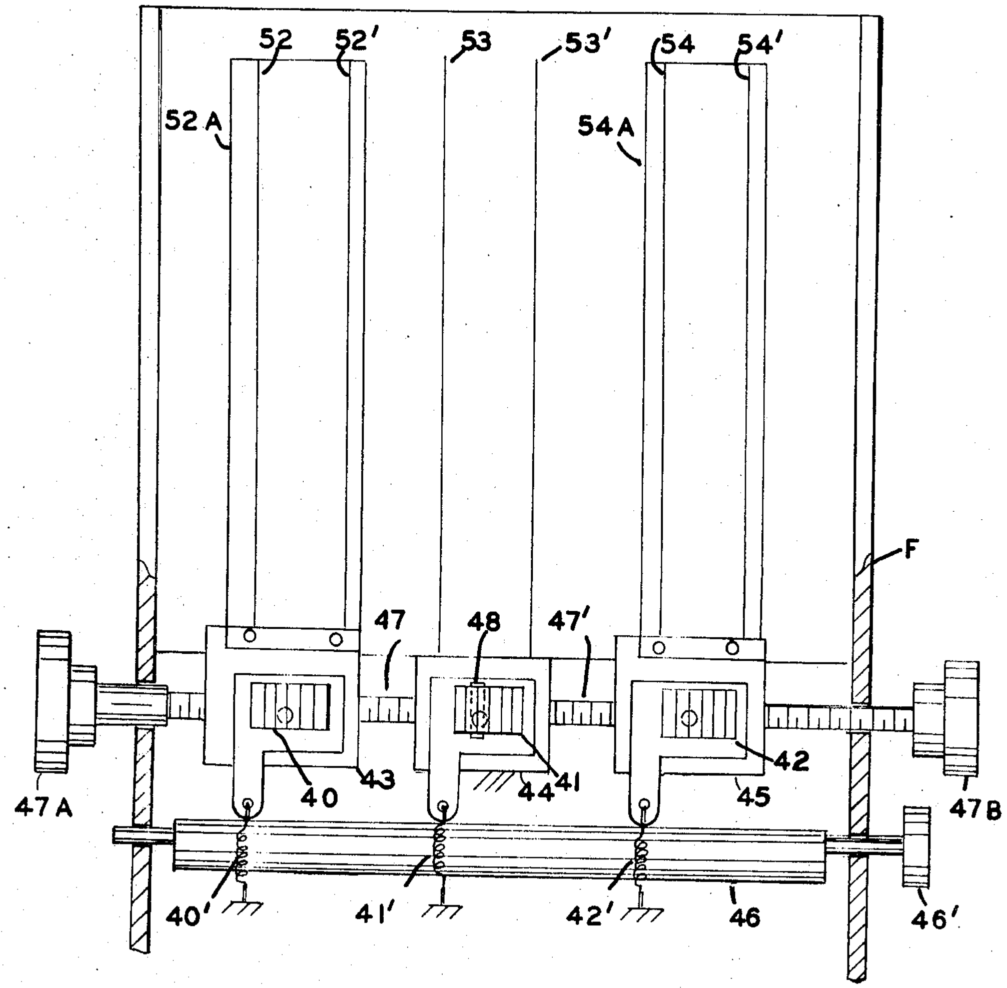
FIG. 3 is a detail view partly in section of another embodiment of the invention.
Figure 5:
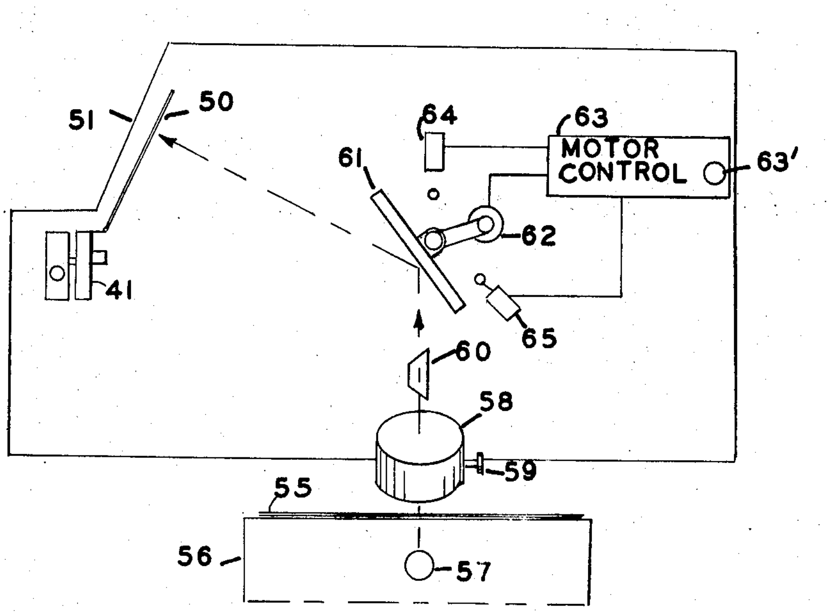
FIG. 5 is a detail view of the embodiment of FIG. 3.
Figure 4:
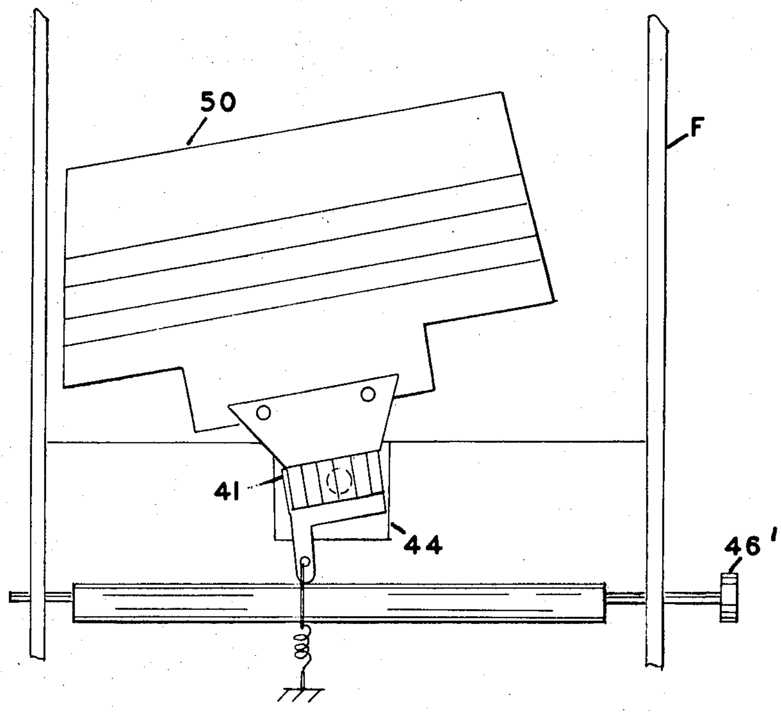
FIG. 4 is a front detail view partly in section of the embodiment of FIG. 3.

FIGS. 3, 4, and 5 show another embodiment of the invention wherein the sensors are adjusted and then remain stationary and the image of the pattern is scanned over the sensors by a pivotally mounted motor driven mirror.

In this embodiment the photo sensors remain stationary during the scan cycle and the image of the data block is passed over the sensors. As before the operator goes through a similar process of aligning the data block on the screen with reference lines. He is however, in this case, aligning the photo detectors with the path that the columns will follow during the scan cycle. The photo detectors are mounted on plates which have 2° of freedom.

Referring to FIGS. 3, 4, and 5, the sensor 40, 41, 42 assemblies are pivotally mounted on blocks 43, 44, 45. The sensor assemblies are spring loaded down by means of the springs 40', 41', 42'. The sensors are adapted to be rotated about their pivots by means of the eccentric roller 46 rotatably mounted in the frame F and which is operated by the knob 46'.

The block members 43 and 45 are mounted on the threaded shafts 47, 47' which are rotatably mounted in the frame F. The blocks 43 and 45 have internal threads so when the shafts 47, 47' are turned then the blocks move axially along the shaft.

The center block 44 is fixed to the frame and the shafts 47 and 47' are connected together within the block 40 by means of the clutch 48. Therefore, if it is desired to move the sensor blocks 43 and 45, this may be done by either knob 47a, 47b. This arrangement also permits separate adjustments of each assembly 45 and 42.

Referring to FIG. 4 and 5, the sensor assembly 41 has attached thereto a transparent plate 50 having series of parallel lines. Therefore, if the image of the pattern is tilted, the rotation control 46' is rotated until the lines of plate 50 line up with the tilted pattern. Transparent plates 52a and 54a which are fixedly connected to the blocks 43 and 45 respectively and each has a series of vertical lines 52, 52', 54, 54', etc. corresponding to the three columns of the dot pattern. Viewing screen 51 has a corresponding pair of lines 53, 53'.

Referring to the FIG. 3 the film 55 is placed on a conventional light table 56 having a conventional light source 57. The light table is preferably part of a conventional viewing device which may be used in locating the film. The optical pickup system includes lens 58 having a magnification adjustment knob 59. A dove prism 60 is preferably incorporated and rotatably mounted so as to rotate the image, if desired. The optical pickup is centered over the dot pattern and the image of the dot pattern is transmitted to the pivotally mounted mirror 61 and then reflected on to a viewing screen 51. When the pattern has been suitably centered on the viewing screen, then the mirror 61 is rotated to cause the pattern to scan over the sensors 41 etc.

The mirror scanning mechanism may include a motor 62 which preferably has conventional motor control means 63 and limit switches 64 and 65. The motor control means may be conventional and is preferably arranged so that the scanning may be started by means of push button 63' so that the mirror will scan in one direction until it is stopped by one limit switch and whereby it automatically returns to start position until stopped by the other limit switch. The particular details of the motor control means are outside the scope of the present invention.

In operation, the user observes the data block on the screen.

1. He rotates the image by rotating the whole instrument about its optical axis or by rotating a prism 60 in the optical system. The image is rotated until the columns are vertical and parallel to the up and down reference lines.

2. He positions the image by moving the film or frame so the center column is in the center of the screen.

3. Adjusts the magnification by lens 59 of the image until the edge columns of the main center column fall on the reference lines 53, 53'.

4. He moves the two other outside sets of vertical reference lines 52, 52 n d 54, 54' by means of knobs 47 and/or 47*a* until they line up with their respective outer columns. Since the outer columns are generally spaced equally from the center of the matrix he needs manipulate only one control because the outer sets of reference lines are coupled to move in opposite directions at the same rate. He does however have the capability for individually adjusting the outer reference sets if required.

5. The operator rotates the nominally horizontal set of reference lines on plate 50 by means of knob 46' so they are parallel with the general direction of the matrix rows. However, he does not have to line anything up—only adjust for parallelism.

6. Presses a readout button 63' which initiates the scanning cycle. The motor 62 then rotates a mirror 61 in the optical path thereby causing the matrix image to be moved over the photoelectric sensors. Having aligned the reference lines with the code matrix columns he is assured that the columns of dots will track properly across the photo cells. At the end of the scan a limit switch is actuated, the motor reverses and returns the viewer to the normal viewing position, where it is stopped by another limit switch.

Many modifications may be made by those who desire to practice the invention without departing from the scope thereby which is defined by the following claims.

I claim:

1. A reader for a rectangular code matrix carried on a film comprising a frame adapted to be mounted to receive an image from said film, means in said frame to receive an image of said matrix, and bar means mounted on said frame to scan said image and a plurality of detectors mounted on said bar means, said bar means extending across said frame and said detectors being longitudinally spaced along said bar means so that each detection will read one line of said matrix, wherein said frame is constructed of four sides which are pivotally connected together at their ends so that said frame can assume a parallelogram shape and means connected to adjust the shape of said frame.

2. Apparatus as in claim 1 comprising motor means, a pair of lead screws rotatably mounted one each on opposite side of said frame and connected to said motor means and means connecting said scanning bar to said lead screws.

3. Apparatus as in claim 2 wherein one end of said lead screws is each connected to a universal-type bearing to permit movement of said frame.

4. Apparatus as in claim 1 having screw-type adjustment means to adjust the shape of said frame.

5. A reader for a code matrix carried on a film comprising, a frame adapted to be mounted to receive an image from said film, a plurality of sensors adjustably mounted in said frame, and means to scan said image over said sensors wherein said frame has a viewing screen and said sensors are rotatably and adjustably mounted to accommodate a skewed image.

6. Apparatus as in claim 5 wherein said sensors are adjustable in position along the width of said image.